(12) United States Patent
Kim

(10) Patent No.: US 6,812,774 B2
(45) Date of Patent: Nov. 2, 2004

(54) METHOD AND APPARATUS FOR GENERATING A HIGH VOLTAGE

(75) Inventor: Gyu-Hong Kim, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/445,805

(22) Filed: May 28, 2003

(65) Prior Publication Data

US 2004/0027102 A1 Feb. 12, 2004

(30) Foreign Application Priority Data

Aug. 8, 2002 (KR) .................................. 10-2002-0046929

(51) Int. Cl.[7] .................................................. G05F 1/10
(52) U.S. Cl. .................................... 327/536; 327/534
(58) Field of Search ................................. 327/530, 534, 327/535, 536, 537, 564, 565, 566

(56) References Cited

U.S. PATENT DOCUMENTS 6,456,150 B1 * 9/2002 Sacco et al. ................. 327/534
6,590,440 B1 * 7/2003 Williams et al. ............. 327/396

* cited by examiner

Primary Examiner—Jeffrey Zweizig
(74) Attorney, Agent, or Firm—Harness, Dickey

(57) ABSTRACT

A method and apparatus for generating a high voltage in a device includes a boosting means that precharges a first node, a second node and a substrate voltage of a charge transfer transistor. The charge transfer transistor may perform a charge sharing operation between the first node and a high voltage generating terminal based on a voltage at the second node. The first node may be boosted to a first voltage, and the substrate voltage may be increased based on a voltage at the high voltage generating terminal. The second node may be boosted to a second voltage different than the first voltage, and the substrate voltage may be increased based on a voltage at the high voltage generating terminal. The substrate voltage may also be increased based on changes to the first voltage of the first node that occur during the charge sharing operation.

20 Claims, 6 Drawing Sheets

METHOD AND APPARATUS FOR GENERATING A HIGH VOLTAGE

BACKGROUND OF THE INVENTION

This U.S. nonprovisional patent application claims priority under 35 U.S.C. § 119 of Korean Patent Application 2002-46929, filed on Aug. 8, 2002, the entire contents of which are hereby incorporated by reference.

1. Field of the Invention

The present invention relates to a method and apparatus for generating a high voltage capable of improving a charge transfer efficiency of a charge transfer transistor.

2. Description of Related Art

A conventional high voltage generating circuit includes a charge transfer transistor having a drain connected to a boosting node, a gate connected to a control node, a source connected to a high voltage generating terminal, and a substrate connected to a ground voltage. Usually, the charge transfer transistor includes a NMOS transistor to transfer the charges of the boosting node to the high voltage generating terminal in response to a voltage of the control node.

Figure 1:
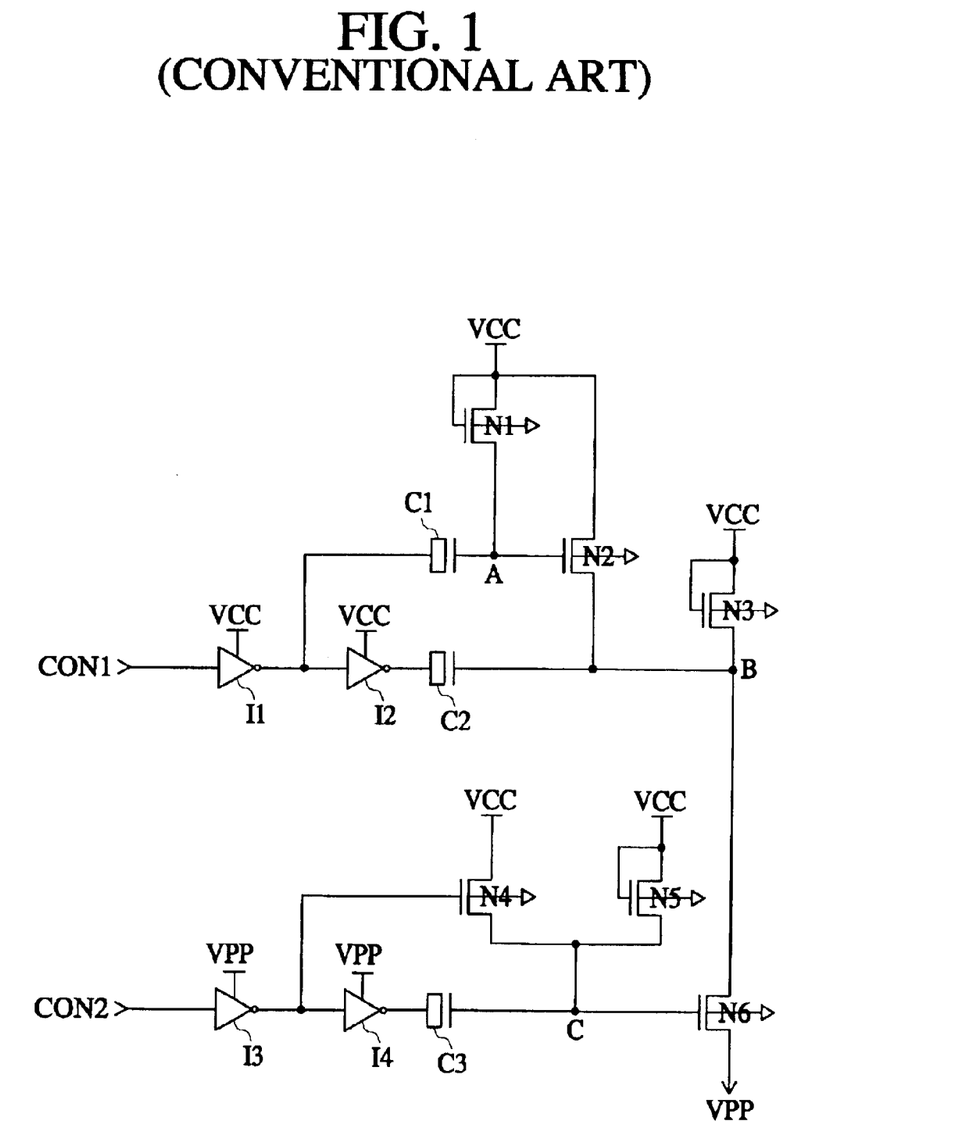
FIG. 1 is a conventional high voltage generating circuit.

FIG. 1 is a circuit diagram of a conventional high voltage generating circuit. The conventional high voltage generating circuit comprises inverters I1, I2, I3 and I4, NMOS capacitors C1, C2 and C3 and NMOS transistors N1 to N6. Inverters I1 and I2 are supplied with a power supply voltage VCC, inverters I3 and I4 are supplied with a high voltage VPP, and the substrates of NMOS transistors N1 to N6 are supplied with a ground voltage.

In operation, inverter I1 inverts a signal CON1, and inverter I2 inverts the inverted output signal of inverter I1. Capacitor C1 boosts the voltage at node A in response to an output signal from inverter I1, which is at VCC. NMOS transistor N1 applies a voltage at node A equal to voltage VCC−Vth. The node A is initially at the level of VCC−Vth, and then is boosted from VCC−Vth to 2VCC−Vth, when VCC−Vth is boosted by capacitor C1. When the voltage at node A exceeds VCC+Vth, the NMOS transistor N2 applies VCC to node B. The NMOS transistor N3 adjusts the node B voltage to VCC−Vth. Capacitor C2 boosts the voltage at node B in response to the output signal from inverter I2, at VCC. That is, the node B is initially at VCC−Vth, and is raised to VCC when the voltage at node A exceeds VCC+Vth. The voltage at node B is then boosted to 2VCC by the capacitor C2.

Inverter I3 inverts a signal CON2, and inverter I4 inverts the inverted output signal of inverter I3, which is at voltage VPP of a high voltage generating terminal. NMOS transistor N4 applies VCC at node C, in response to the output signal at VPP from inverter I3. NMOS transistor N5 adjusts node C voltage to VCC−Vth. Capacitor C3 boosts the voltage at node C in response to the output signal (VPP) of inverter I4. Node C is initially at VCC−Vth, and becomes VCC when the output voltage of inverter I3 exceeds VCC+Vth. Thus, the voltage at node C is boosted to VCC+VPP by capacitor C3. NMOS transistor N6 is turned on in response to the voltage at node C, and a charge sharing operation between node B and the high voltage generating terminal VPP is performed. Hence, NMOS transistor N6 may be referred to as a charge sharing transistor.

Figure 2:
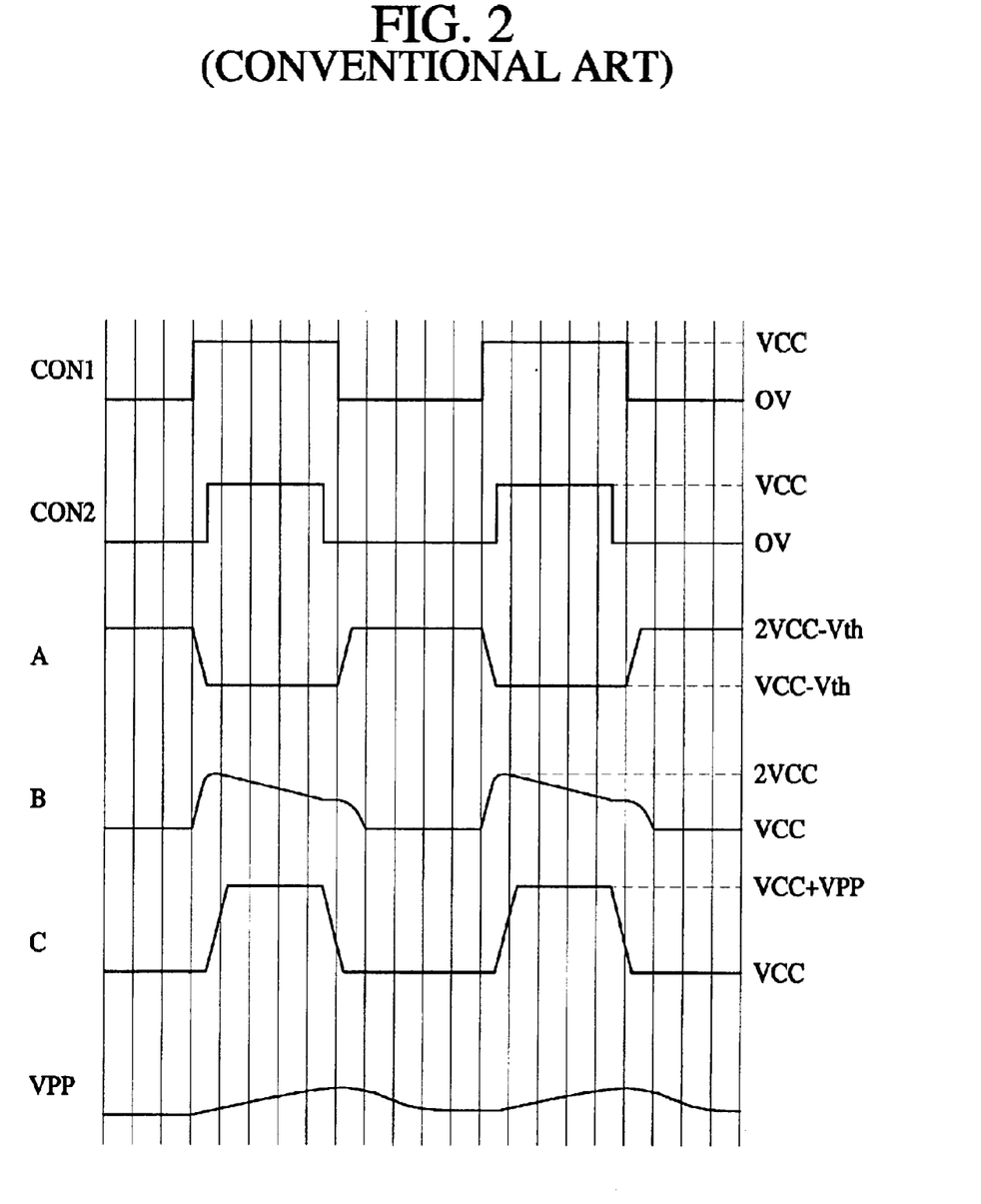
FIG. 2 illustrates a signal waveform representing the changes of the voltage of each nodes of the circuit of FIG. 1.

FIG. 2 is a signal waveform representing the voltage changes at each node in the circuit of FIG. 1. As shown in FIG. 2, voltage Vth is a threshold voltage of each of the NMOS transistors N1 to N6.

Initially, nodes A, B and C are precharged by the voltages 2VCC−Vth, VCC and VCC, respectively, when the signals CON1 and CON2 of a ground voltage level are applied to the high voltage generating circuit. Accordingly, when nodes A, B and C are supplied with CON1 and CON2 at VCC, the voltage of node A becomes VCC−Vth, the voltage at node C is boosted to VCC+VPP, and the voltage at node B is boosted to 2VCC. At the same time, since the voltage at node C equals VCC+VPP, NMOS transistor N6 is turned on to share the charge between node B and the high voltage generating terminal VPP, thereby increasing the voltage of the high voltage generating terminal VPP.

Accordingly, the voltage of high voltage generating terminal VPP is increased during the charge sharing operation; thus the voltage difference between the source and the substrate of the NMOS transistor N6 widens, resulting in an increase of the threshold voltage of NMOS transistor N6. However, the voltage at node C (supplied to the gate of the NMOS transistor N6) is fixed to voltage VCC+VPP. Thus, NMOS transistor N6 is not able to sufficiently transfer the charges from node B to the high voltage generating terminal VPP.

In other words, the substrate of NMOS transistor N6 becomes the ground voltage, and its source becomes the high voltage VPP (or 2VCC). Accordingly, the voltage difference between the source and the substrate becomes VPP (or 2VCC). Thus, the threshold voltage (Vth) of NMOS transistor N6 increases by several hundred volts, as compared to the case where the voltage difference between the source and substrate is equal to zero. However, the voltage applied to the gate of NMOS transistor N6 is maintained at VPP+VCC, resulting in a potential deterioration in transfer efficiency of the charge transfer transistor (i.e., NMOS transistor N6).

If the voltage difference between the source and substrate of NMOS transistor N6 is substantially uniform or uniform, the Vth is not increased, and deterioration of the charge transfer efficiency of charge transfer transistor N6 may be reduced. In other words, the charge transfer efficiency of the charge transfer transistor would not deteriorate if the voltage of the substrate is increased based on an increment of the voltage at the source.

When boosting the high voltage in a conventional high voltage generating circuit such as shown in FIG. 1, a threshold voltage of the NMOS transistor N6 is increased according to an increment of the source voltage of the NMOS transistor N6, and the substrate of the transistor is fixed to the ground voltage. Thus, a threshold voltage of NMOS transistor N6 in FIG. 1 increases in proportion to an increase in a voltage difference between the substrate and source. At this time, if the gate voltage of the NMOS transistor N6 is uniformly fixed, the NMOS transistors in FIG. 1 are not able to transfer sufficiently transfer the charges of a boosting node (i.e., node B) to the high voltage-generating terminal (i.e., VPP).

Therefore, when-boosting high voltage in a conventional high voltage generating circuit, such as is shown in FIG. 1, the threshold voltage of the charge transfer transistor (i.e., NMOS transistor N6 in FIG. 1) is increased according to a voltage difference between the substrate and the source. Accordingly, the conventional high voltage generating circuit cannot rapidly transfer charges of the boosting node (i.e., node B) to the high voltage generating terminal VPP.

SUMMARY OF THE INVENTION

Exemplary embodiments of the present invention are directed to a method and apparatus for generating a high voltage in a device. A boosting means precharges a first node, a second node and a substrate voltage of a charge transfer transistor. The charge transfer transistor may be configured to perform a charge sharing operation between the first node and a high voltage generating terminal based on a voltage at the second node. The first node may be boosted to a first voltage, and the substrate voltage may be increased based on a voltage at the high voltage generating terminal. The second node may be boosted to a second voltage different than the first voltage, and the substrate voltage may be increased based on a voltage at the high voltage generating terminal. The substrate voltage may also be increased based on changes to the first voltage of the first node that occur during the charge sharing operation performed by the charge transfer transistor.

BRIEF DESCRIPTION OF THE DRAWINGS

For a more complete understanding of the exemplary embodiments of the present invention and the advantages thereof, reference is now made to the following descriptions taken in conjunction with the accompanying drawings, in which like reference numerals designate like elements, wherein.

DETAILED DESCRIPTION OF EXEMPLARY EMBODIMENTS

Figure 3:
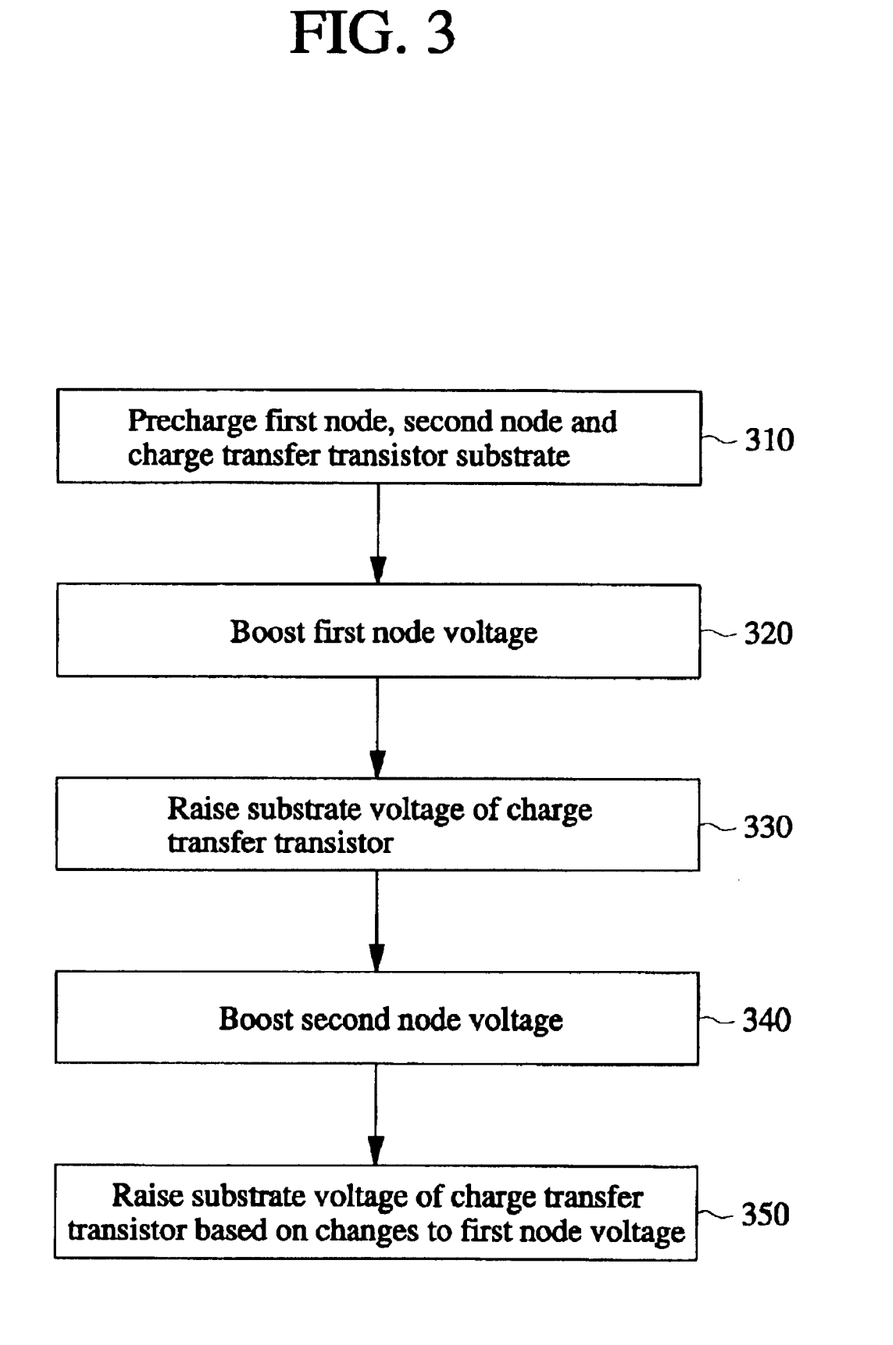
FIG. 3 is a flowchart illustrating a method of generating a high voltage in accordance with the exemplary embodiments of the present invention.

FIG. 3 is a flowchart illustrating a method of generating a high voltage in accordance with the exemplary embodiments of the present invention. Referring to FIG. 3, within a high voltage generating circuit, a first node, second node and a substrate voltage of a charge transfer transistor may be precharged (function 310). The high voltage generating circuit may include a charge transfer transistor. The charge transfer transistor performs a charge sharing operation between the first node, which may also be referred to as a boosting node, and a high voltage generating terminal of the high voltage generating circuit. This charge sharing operation may be performed based on a voltage level at the second node, which in an exemplary embodiment may be a control node. The first node is boosted (function 320) to a first voltage, and the substrate voltage of the charge transfer transistor is increased (function 330) based on a voltage at the high voltage generating terminal.

The second node may be boosted (function 340) to a second voltage that is higher than the first voltage of the first node. Based on changes to the first voltage at the first node, which occur during the charge sharing operation performed by the charge transfer transistor, the substrate voltage may be further increased (function 350).

Figure 4:
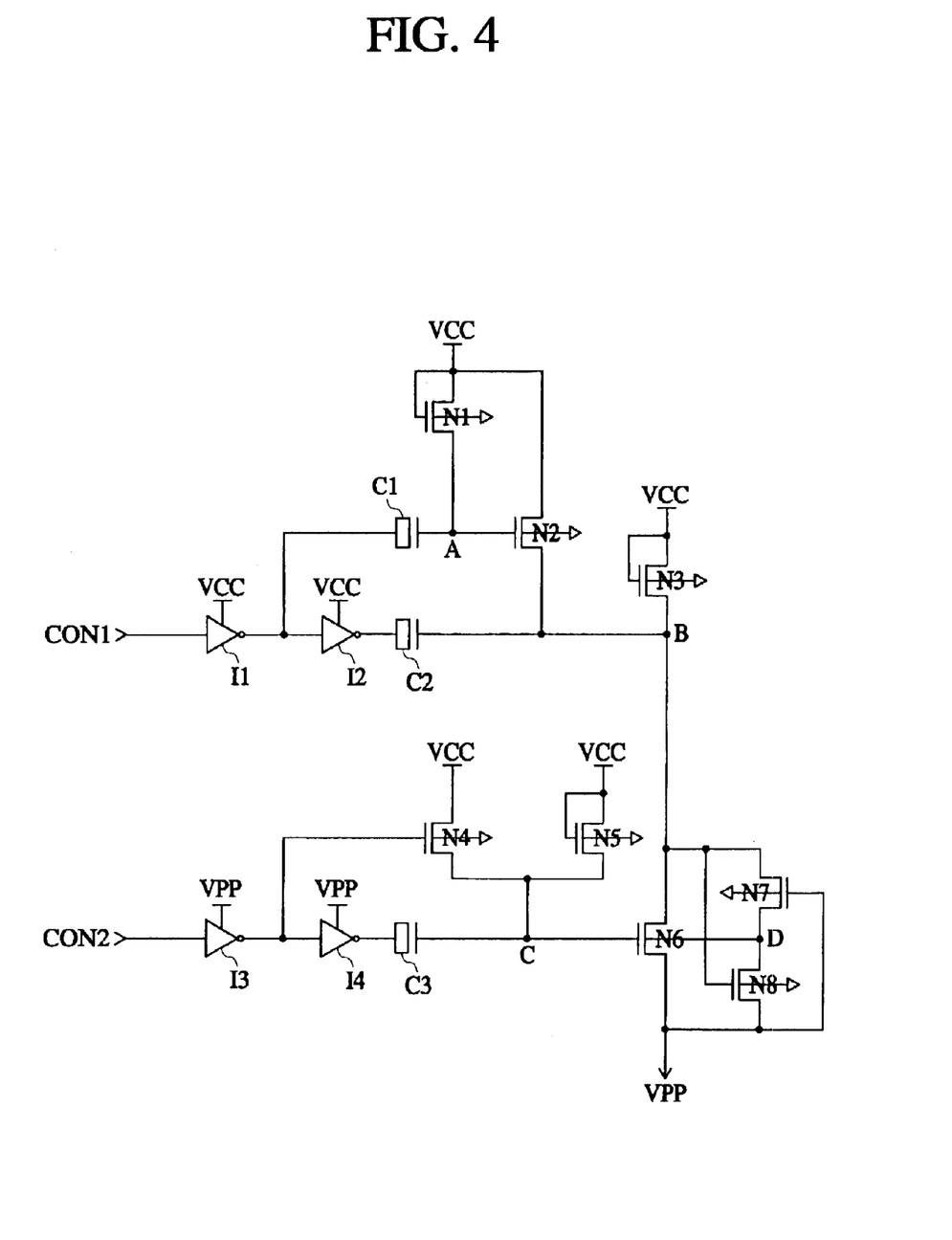
FIG. 4 is a circuit diagram of a high voltage generating circuit according to the exemplary embodiments of the present invention.

FIG. 4 is a circuit diagram of a high voltage generating circuit according to the exemplary embodiments of the present invention. Referring to FIG. 4, the drain of an NMOS transistor N7 is connected to the drain of the NMOS transistor N6, the gate of NMOS transistor N7 is connected to the high voltage generating terminal VPP, and the source of NMOS transistor N7 is connected to node D. The source of an NMOS transistor N8 is connected to node D, the gate of NMOS transistor N8 is connected to node B, the drain of NMOS transistor N8 is connected to high voltage generating terminal VPP, and the substrate of NMOS transistor N6 is connected to node D.

In operation, when signals CON1 and CON2 are at a ground voltage level, node B is at a power supply voltage, VCC, and the high voltage-generating terminal is at VPP. In this case, since VPP is greater than VCC+Vth, NMOS transistor N7 is turned on so that voltage at node D becomes VCC.

When the signal CON1 transits from the ground voltage level to VCC, the voltage at node B reaches 2VCC. If a voltage difference between a voltage (VPP) at the high voltage generating terminal (VPP) and the voltage at node D is greater than the threshold voltage Vth of NMOS transistor N7, NMOS transistor N7 is turned on to raise voltage at node D to VPP−Vth. If the voltage difference between VPP and the voltage at node D is smaller than Vth of NMOS transistor N7, NMOS transistor N7 is turned off.

When the signal CON2 transits from the ground voltage level to VCC, the voltage at node C is boosted to VCC+VPP. Accordingly, NMOS transistor N6 is turned on, and a charge sharing operation is performed between node B and the high voltage generating terminal at VPP. According to the charge sharing operation, while the voltage at node B decreases, VPP of the high voltage generating terminal is increased. As a result, NMOS transistor N8 is turned on to raise the voltage at node D to 2VCC−Vth. In other words, if the voltage at node B is greater than Vth of NMOS transistor N8, the NMOS transistor N8 is turned on to raise voltage at node D to 2VPP−Vth. If the voltage difference between node B and node D is smaller than Vth of the NMOS transistor N8, the NMOS transistor N8 is turned off.

Figure 5:
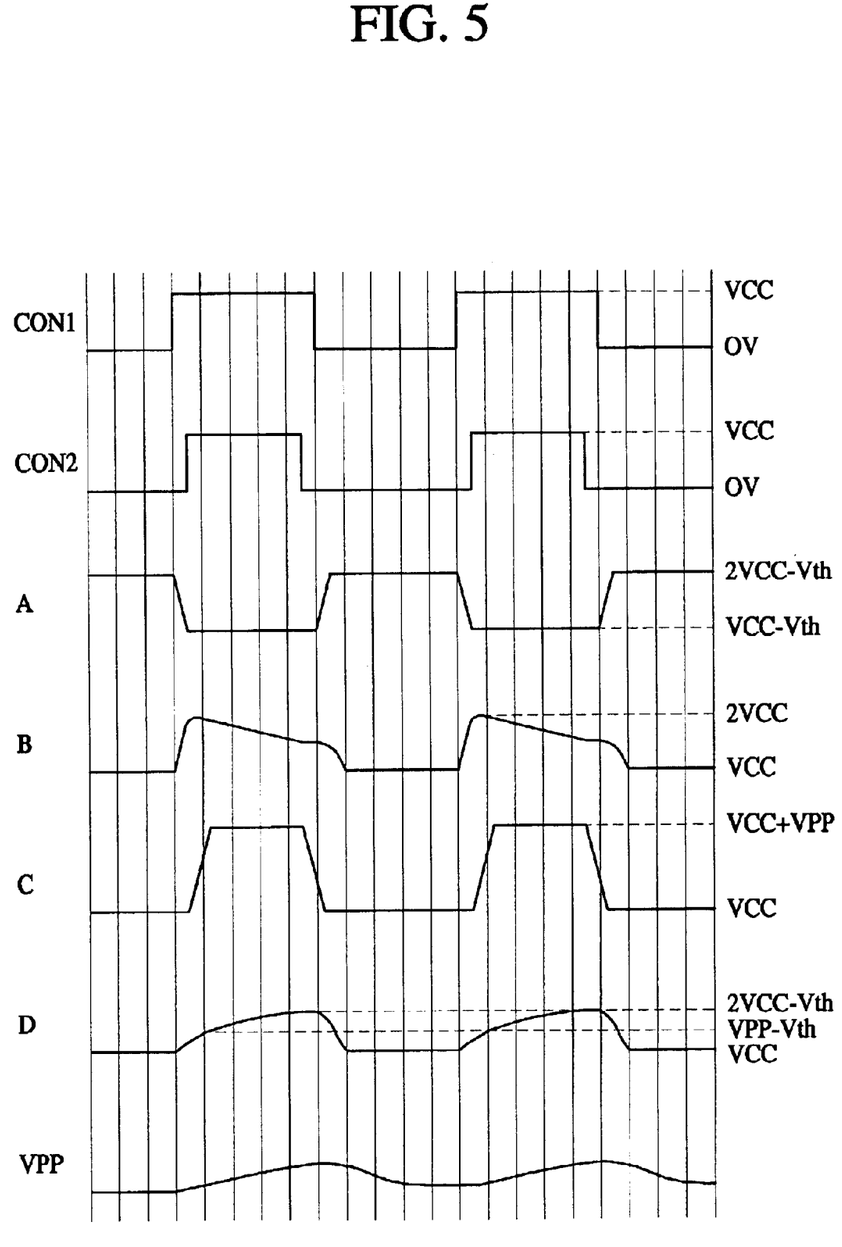
FIG. 5 illustrates a signal waveform representing the changes in voltage at each node in the circuit of FIG. 4.

FIG. 5 illustrates a signal waveform representing the changes of the voltage of each nodes of the circuit of FIG. 4. In FIG. 5, voltage Vth is referred to a threshold voltage of each of the NMOS transistors N1 to N8.

Initially, when signals CON1 and CON2 are applied to the high voltage generating circuit, nodes A, B and C are precharged by the voltages 2VCC−Vth, VCC and VCC, respectively, and the voltage at node D becomes VCC. In this state, when signal CON1 of power supply voltage VCC is applied to the high voltage generating circuit, the voltage at node A becomes VCC−Vth, and the voltage at node B is boosted to 2VCC. Accordingly, the NMOS transistor N7 is turned on so that the voltage at node D becomes VPP−Vth.

When signal CON2 of power supply voltage VCC is applied to the high voltage generating circuit, the voltage at node A becomes VCC−Vth, and the voltage at node C becomes VCC+VPP. Accordingly, the NMOS transistor N6 is turned on so that the charge sharing operation is performed between node B and the high voltage generating terminal VPP, thereby increasing the voltage level of the high voltage generating terminal VPP. Also, the NMOS transistor N8 is turned on to gradually increase the voltage of the high voltage generation terminal VPP. In other words, while the charge sharing operation is performed by NMOS transistor N6, NMOS transistor N8 is simultaneously turned on to increase the voltage (VPP) at high voltage generating terminal VPP, thereby increasing the voltage level at node D.

Therefore, according to the high voltage generating circuit of the present invention, if the signal CON1 transits to power supply voltage VCC, the NMOS transistor N8 is turned on. Thus, the voltage at node D, which is the substrate of the NMOS transistor N6, is also increased, thereby reducing the voltage difference between the source and the substrate of the NMOS transistor N6. Also, if the signal CON2 transits to the power supply voltage VCC and voltage of the high voltage generating terminal is increased VPP, the NMOS transistor N8 is turned on. Thus, the voltage at node D, i.e., the substrate of the NMOS transistor N6, is also increased, thereby reducing the voltage difference between the source and the substrate of the NMOS transistor N6.

Accordingly, the high voltage generating circuit in accordance with the exemplary embodiments of the present invention may rapidly transfer charges from node B to the high voltage generating terminal, since the substrate voltage of the NMOS transistor N6 can increase according to an increment of the source voltage of the NMOS transistor N6. The threshold voltage of the NMOS transistor N6 is not increased.

However, the substrate of NMOS transistor N6 does not separate, as in the case of a NMOS transistor substrate constructed of a single well structure and a twin well structure. The NMOS transistor N6 may be constructed of a triple well structure, for example.

Figure 6:
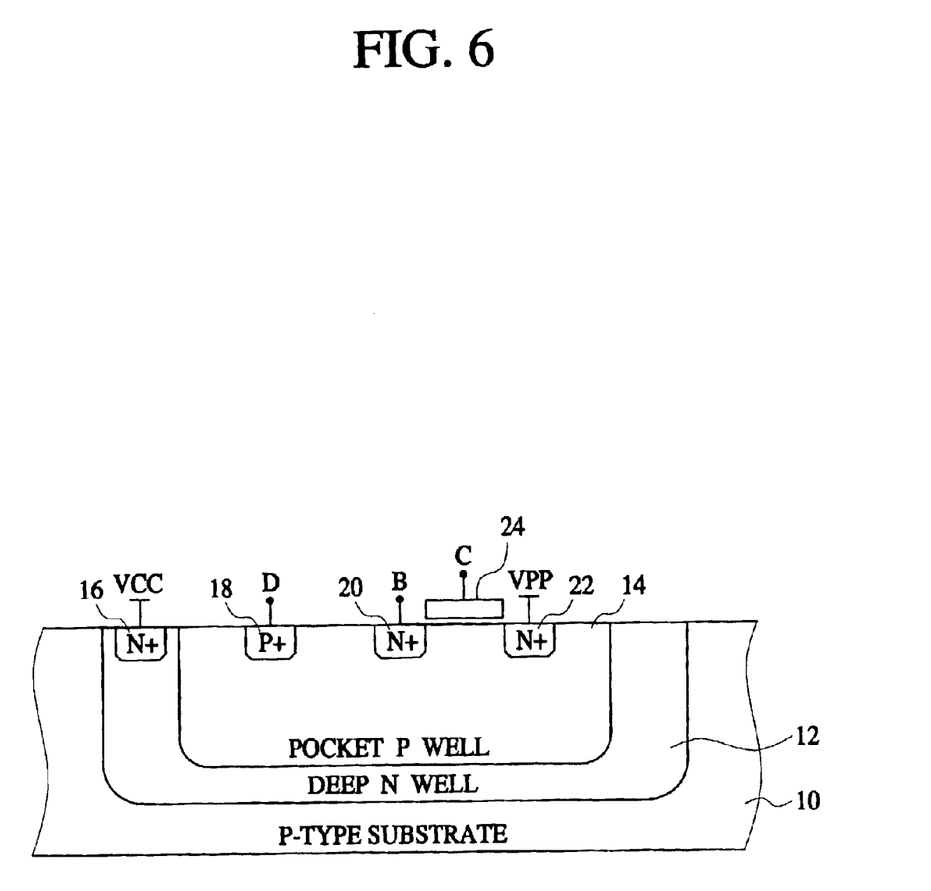
FIG. 6 is a cross-sectional view of a charge transfer transistor according to the exemplary embodiments of the present invention.

FIG. 6 is a cross-sectional view of a charge transfer transistor according to the exemplary embodiments of the present invention. The charge transfer transistor may form a deep N well 12 on a p-type substrate 10, and may form a pocket P well 14 in the deep N well 12. Then, the charge transfer transistor forms a N+ active area 16 in the deep N well 12, a P+ active area 18 and N+ active areas 20 and 22 in pocket well 14, and also forms a gate area 24 on surface between the N+ active areas 20 and 22. Furthermore, the N+ active areas 16 and 22 may be connected to the high voltage generating terminal, the P+ active area 18 may be connected to node D, the N+ active area 20 may connected to the node B, and the gate area 24 may be connected to node C.

The charge transfer transistor according to the exemplary embodiments of the present invention may be constructed as a triple well structure, for example. Thus, the N+ active area 16 in the deep N well 12 may be connected to the high voltage generating terminal and the P+ active area 18 in pocket P well I4 may be connected to the node D, in an effort to raise the voltage of the high voltage generating circuit to 2VCC–Vth. As a result, a latch up phenomenon may be avoided.

The exemplary embodiments of the present invention may provide a high voltage generating circuit capable of improving charge transfer efficiency by preventing an increment of the threshold voltage in the charge transfer transistor. Further, a semiconductor device connected to, or interfacing with the high voltage generating circuit of to the exemplary embodiments of the present invention may improve device reliability of the semiconductor device.

While the present invention has been particularly shown and described with reference to exemplary embodiments thereof, it will be understood by those skilled in the art that the foregoing and other changes in form and details may be made therein without departing from the spirit and scope of the exemplary embodiments of the present invention.

What is claimed is:

1. A method for generating a high voltage in a device, comprising:

preparing a first node, second node and substrate voltage of a charge transfer transistor, the charge transfer transistor adapted to perform a charge sharing operation between the first node and a high voltage generating terminal based on a voltage at the second node;

first boosting the first node to a first voltage;

first increasing the substrate voltage based on a voltage at the high voltage generating terminal;

second boosting the second node to a second voltage different than the first voltage; and second increasing the substrate voltage based on changes to the first voltage of the first node that occur during the charge sharing operation performed by the charge transfer transistor.

2. The method of claim 1, wherein said first increasing is performed during said first boosting.

3. The method of claim 1, wherein the second voltage is higher than the first voltage.

4. An apparatus for generating a high voltage, comprising:

boosting means precharging a first node in a precharging operation and boosting a voltage at the first node in a boosting operation;

control means for precharging a second node during the precharging operation and for boosting a voltage at the second node during the boosting operation;

a charge transfer transistor having a substrate and configured to perform a charge sharing operation to share charges between the first node and a high voltage generating terminal in response to the voltage at the second node; and substrate voltage control means boosting a substrate voltage of the charge transfer transistor based on a voltage increase at the high voltage generating terminal.

5. The apparatus of claim 4, wherein the first node is a boosting node and the second node is a control node.

6. The apparatus of claim 4, wherein the substrate voltage control means precharges the substrate voltage during the precharging operation, increases the substrate voltage based on changes to a voltage at the high voltage generating terminal, and increases the substrate voltage based on changes to the voltage at the first node.

7. The apparatus of claim 6, wherein the changes to the voltage at the high voltage generating terminal occur during the boosting operation, and the changes to the voltage at the first node occur during the charge sharing operation.

8. The apparatus of claim 6, wherein the substrate voltage control means includes:

a first transistor connected between the high voltage generating terminal and the substrate of the charge transfer transistor for increasing the substrate voltage in response to changes of the voltage level at the first node; and a second transistor connected between the first node and the substrate for increasing the substrate voltage in response to changes of the voltage level at the high voltage generating terminal.

9. The apparatus of claim 8, wherein the first transistor and second transistor are NMOS transistors.

10. The apparatus of claim 4, wherein the charge transfer transistor is a NMOS transistor characterized by:

a deep N well formed on a p-type substrate, a pocket P well formed in the deep N well, a N+ active area formed in the deep N well, a P+ active area and two N+ active areas formed in the pocket P well, and a gate area formed on a surface between the two N+ active areas.

11. The apparatus of claim 10, wherein the N+ active area in the deep N well and one of the two N+ active areas in the pocket P well are connected to the high voltage generating terminal, the P+ active area is connected to the node D, and the other of the two N+ active areas is connected to the first node.

12. A high voltage generating circuit, comprising:

boosting means precharging a boosting node to a first voltage in a precharging operation and boosting the boosting node to a second voltage in a boosting operation;

a control means precharging a control node to the first voltage during the precharging operation and boosting the control node to a third voltage different than the second voltage during the boosting operation;

a charge transfer transistor having a substrate at a substrate voltage and configured to perform a charge sharing operation to share charges between the boosting node and a high voltage generating terminal in response to the third voltage;

a first substrate voltage control transistor for precharging the substrate voltage during the precharging operation, and increasing the substrate voltage of the charge transfer transistor based on changes to a voltage level at the high voltage generating terminal; and a second substrate voltage control transistor connected between the high voltage generating terminal and the substrate of the charge transfer transistor for increasing the substrate voltage based on changes to the voltage level at the boosting node.

13. The circuit of claim 12, wherein the third voltage is higher than the second voltage.

14. The circuit of claim 12, wherein the first substrate voltage control transistor is connected between the boosting node and the substrate of the charge transfer transistor.

15. The circuit of claim 12, wherein the changes to the voltage level at the high voltage generating terminal occur during the boosting operation of the boosting node.

16. The circuit of claim 12, wherein the changes to the voltage level at the boosting node occur during the charge sharing operation.

17. The circuit of claim 12, wherein the charge transfer transistor is a NMOS transistor characterized by:

a deep N well formed on a p-type substrate, a pocket P well formed in the deep N well, a N+ active area formed in the deep N well, a P+ active area and two N+ active areas formed in the pocket P well, and a gate area formed on a surface between the two N+ active areas.

18. The circuit of claim 17, wherein the N+ active area in the deep N well and one of the two N+ active areas in the pocket P well are connected to the high voltage generating terminal, the P+ active area is connected to the node D, and the other of the two N+ active areas is connected to the first node.

19. The circuit of claim 12, wherein the first substrate voltage control transistor and second substrate voltage control transistor are NMOS transistors.

20. In the high voltage generating circuit having a charge transfer transistor that performs a charge sharing operation to share charges between a boosting node and a high voltage generating terminal in response to a voltage of a control node, a method for generating a high voltage, comprising:

precharging the boosting node, the control node and a substrate voltage of the charge transfer transistor in response to a voltage of the high voltage generating terminal;

first boosting the boosting node to a first voltage during the boosting operation;

first increasing the substrate voltage of the charge transfer transistor based on changes to the voltage of the high voltage generating terminal occurring during said first boosting;

second boosting the control node to a second voltage higher than the first voltage during said second boosting operation; and second increasing the substrate voltage based on changes to the voltage of the boosting node occurring during the charge sharing operation.

* * * * *